No. 771,383. PATENTED OCT. 4, 1904.
J. H. MORRIS.
ANIMAL TRAP.
APPLICATION FILED APR. 28, 1904.
NO MODEL.

Witnesses
W. E. Peck.
M. L. Lange.

Inventor
per J. H. Morris
Higdon & Higdon
Att'ys.

No. 771,383.  Patented October 4, 1904.

UNITED STATES PATENT OFFICE.

JOHN H. MORRIS, OF OMAHA, NEBRASKA, ASSIGNOR OF ONE-HALF TO CHARLES A. SWEET, OF OMAHA, NEBRASKA.

ANIMAL-TRAP.

SPECIFICATION forming part of Letters Patent No. 771,383, dated October 4, 1904.

Application filed April 28, 1904. Serial No. 205,335. (No model.)

*To all whom it may concern:*

Be it known that I, JOHN H. MORRIS, a citizen of the United States, residing at Omaha, in the county of Douglas and State of Nebraska, have invented new and useful Improvements in Animal-Traps, of which the following is a specification.

My invention relates to animal-traps, and is peculiarly adapted for catching mice; and my object in producing such a trap is because it is simple and cheap in construction and reliable in practice.

Figure 1:
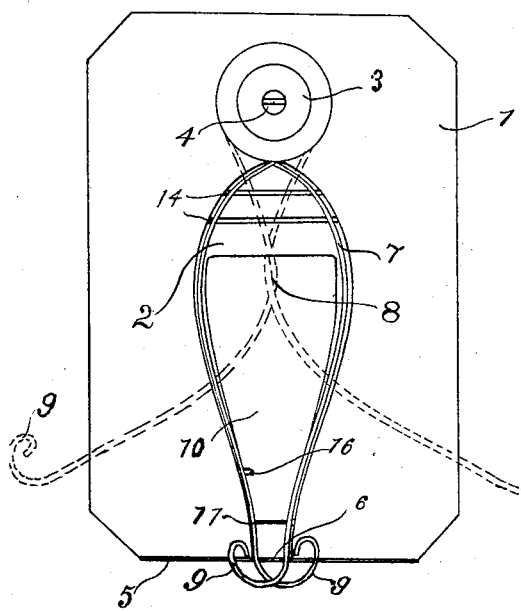
Figures 2, 3:
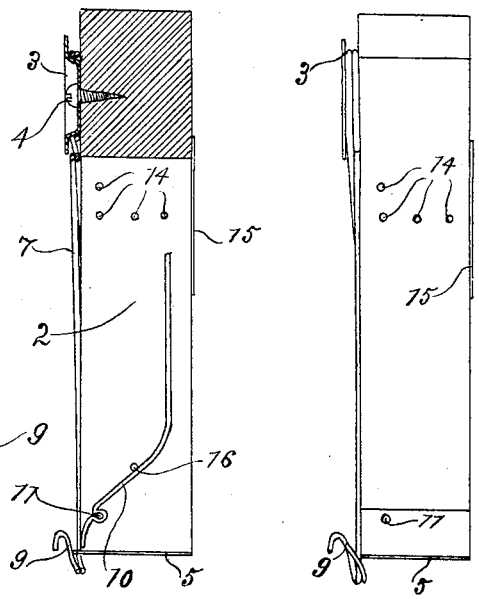
Figure 4:
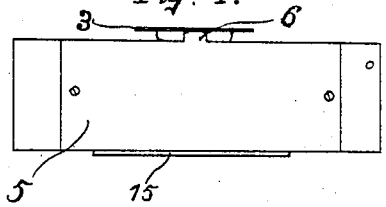
Figure 5:
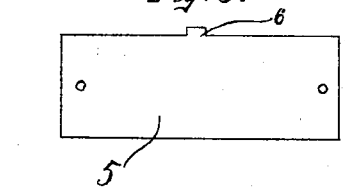
Figure 6:
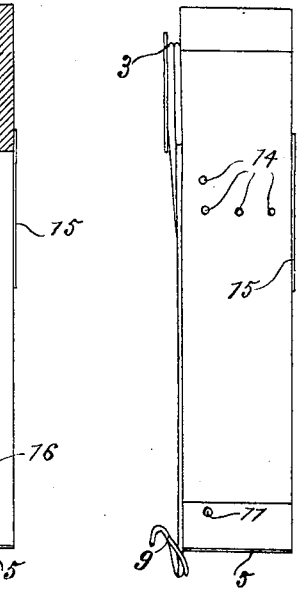

Referring to the accompanying drawings, Figure 1 is a top plan view disclosing the same in a set position indicated in dotted lines when the trap is sprung. Fig. 2 is a longitudinal sectional view. Fig. 3 is a longitudinal side elevation. Fig. 4 is a front elevation of Fig. 1. Fig. 5 is a detail view of a piece of sheet metal detached from Fig. 1. Fig. 6 is a broken inverted plan view of Fig. 1.

I will further describe my invention by referring to corresponding numerals on the drawings and specification.

To construct my trap, I first take a block of wood 1. I then cut a pear-shaped opening 2 flatwise through the block, as indicated. At the rear or large end of said opening is a flanged disk or button 3, which is made secure to the block 1 by a screw 4. Across the front end of block 1 is a piece of sheet metal 5 of the same dimension in width as the thickness of the block. This piece of sheet metal is rigidly secured by rivets or screws to the end of block 1 and covers the open end of the slot 2. Said piece of sheet metal is provided with an upwardly-extending lug 6 of about a quarter of an inch in width to about one-fourth inch in height. I then take a piece of spring-wire 7 of sufficient length and give it one or more turns around the button 3. Then I bring the two ends forward and give them a half-turn, as indicated at 8 in Fig. 1 in dotted lines, after which I gradually curve the two ends outward. I then abruptly curve the two extreme ends 9, as indicated in dotted lines and more clearly shown at Figs. 2 and 3. I then provide a trigger 10, constructed of thin metal, which conforms to the inside of the opening 2 through the block. Said trigger is pivotally secured at 11 in the said opening 2, which is clearly shown in Fig. 2.

To set the trap ready for catching a mouse or other small animal, the extended ends 9 in dotted lines are grasped between the finger and thumb and are brought together and locked over the upwardly-projecting lug 6. It will now be observed that when the trap is set in this position the upwardly extreme end of the trigger 10 is immediately under the ends of the spring-wires 7, while the body of the trigger extends back through the opening 2 of the trap, as indicated at Fig. 2.

I have further provided bait-retaining bars 14 horizontally across the rear end of the opening in the block. The object of these bars is to keep the bait, such as a small piece of cheese or fresh meat, in the proper place to induce the mouse to press upon the trigger 10 in its effort to nibble the bait.

To bait the trap, it is turned bottom side up, as indicated at the inverted plan view of Fig. 6. The bait is placed in between the bars and the extreme rear end of the opening, when the plate 15, which is pivotally secured to the block at 17, is brought around from the position indicated in dotted lines over the bait to the position shown in solid lines, which prevents the bait from falling out when the trap is being handled preparatory to placing it in position to catch an animal.

The operation of the trap is as follows: The trap is first set, as indicated in solid lines at Fig. 1. The extreme upper end of the tongue 2 delicately engages the two wires. The mouse is liable in its effort to get at the bait to place its fore feet on the broad or lower end of the trigger 10. This will cause the trap to spring, when the mouse is caught between the coils of the wires, as indicated at 8 of the dotted lines in Fig. 1.

In order that the trigger may not rattle when the trap is set, I have provided a small pin or lug 16, which holds it in proper position, as shown.

Having now fully described my invention, what I claim as new, and desire to secure by Letters Patent of the United States, is—

1. In a mouse or animal trap of the character described the combination of a suitable block of wood or body portion an opening through said block, a button or disk secured to the upper face of the block at the rear of said opening, a metallic plate, a projecting lug integral to said plate secured to the front end of the block, said lug adapted to extend above the face of the block thereof, a wire spring mounted on said disk, having laterally-extending ends, intermediate locking portions over the opening in the block, the said laterally-extending ends adapted to be depressed to engagement with the projecting lug, substantially as described.

2. In a mouse-trap of the character described, a suitable body portion, an opening through said portion, a disk and a spring mounted thereon, a metallic plate, a projecting lug integral thereto and adapted to be engaged by the ends of the wire springs, a trigger mounted in the opening of the block under the path of the said springs adapted to cause disengagement of the springs with the lug when disturbed, substantially as described.

3. In a mouse or animal trap of a suitable block of wood, and opening through the block, a spring and spring-retaining disk mounted thereon, a trigger mounted in said opening, a metallic plate, a projecting lug integral to the plate secured to one end of the block adapted to engage and disengage with the springs, a lug or pin projecting from the side walls of the opening in the block, bait-retaining bars at the rear of the opening, and a bait-retaining plate pivotally secured to the under side of the trap, substantially as described.

In testimony whereof I affix my signature in the presence of two witnesses.

JOHN H. MORRIS.

Witnesses:
 FRED L. SMITH,
 GEO. HAULISTON.